United States Patent [19]

Anani et al.

[11] Patent Number: 5,541,019

[45] Date of Patent: Jul. 30, 1996

[54] METAL HYDRIDE ELECTROCHEMICAL CELL HAVING A POLYMER ELECTROLYTE

[75] Inventors: Anaba A. Anani, Lawrenceville; Veronica R. Reichert, Bethlehem; Kenneth M. Massaroni, Berkeley Lake, all of Ga.

[73] Assignee: Motorola, Inc., Schaumburg, Ill.

[21] Appl. No.: 554,061

[22] Filed: Nov. 6, 1995

[51] Int. Cl.⁶ ............................ H01M 4/38; H01M 10/36
[52] U.S. Cl. ............................ 429/59; 429/192; 429/222
[58] Field of Search ........................... 429/59, 192, 222

[56] References Cited

U.S. PATENT DOCUMENTS

| | | | |
|---|---|---|---|
| 4,847,174 | 7/1989 | Palmer et al. | 429/192 X |
| 5,104,617 | 4/1992 | Fetcenko et al. | 420/588 |
| 5,238,756 | 8/1993 | Fetcenko et al. | 429/59 |
| 5,393,617 | 2/1995 | Klein | 429/59 |
| 5,451,474 | 9/1995 | Wu et al. | 429/59 |

*Primary Examiner*—John S. Maples
*Attorney, Agent, or Firm*—Kenneth M. Massaroni

[57] ABSTRACT

An improved metal hydride hydrogen storage alloy electrochemical cell (10) includes a positive electrode (20) and a negative electrode (30) having disposed therebetween, a polymer electrolyte (40). The polymer electrolyte (40) comprises a polymer support structure fabricated of, for example, polyvinyl alcohol or polyvinyl acetate, and having dispersed therein an electrolyte active species such as, for example, KOH. The improved electrolyte for a metal hydride hydrogen storage alloy cell provides a battery cell free from electrolyte leakage, and having ionic conductivities which allow for an efficient use of the metal hydride electrodes.

6 Claims, 1 Drawing Sheet

METAL HYDRIDE ELECTROCHEMICAL CELL HAVING A POLYMER ELECTROLYTE

TECHNICAL FIELD

This invention relates in general to electrochemical hydrogen storage cells, and particularly to rechargeable electrochemical hydrogen storage cells having polymer electrolytes.

BACKGROUND OF THE INVENTION

Rechargeable electrochemical cells that use nickel hydroxide positive electrodes and a metal hydride negative electrode are well known in the art. In fact, over the past several years metal hydride cells have gained wide spread market acceptance due to the fact that they incorporate desirable performance characteristics into a low cost relatively environmentally benign package. Examples of these desirable performance characteristics include high charge acceptance, relatively long cycle life and operation over a wide range of temperatures. Each of these performance characteristics represents improvements over the nickel cadmium and other battery systems known in the prior art.

Typically, metal hydride hydrogen storage electrodes are used as the negative electrode in the hydrogen storage system. The negative electrode material (M) is charged by the electrochemical absorption of hydrogen and the electrochemical evolution of a hydroxyl ion. The reaction which takes place at the metal hydride electrode may be described by the following formula:

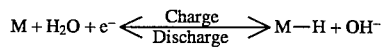

The reaction that takes place at the positive electrode of a nickel metal hydride cell is also a reversible reaction. In the case of the nickel hydroxide electrode, the positive electrode reaction is as follows:

The negative electrode of most metal hydride electrochemical cells can be characterized by one of two chemical formulas. The first is $AB_2$ which describes a TiNi type battery systems such as described in, for example, U.S. Pat. No. 5,277,999. The second formula is $AB_5$ which describes a $LiNi_5$ type systems as described in, for example, U.S. Pat. No. 4,487,817. Substantially all metal hydride electrochemical cells fall into one of these two categories. Cadmium can also be considered a hydrogen storing material in the sense that it can store hydrogen as a hydroxide, i.e., $Cd(OH)_2$.

Regardless of the type of material, it is commonly the case that the electrolyte used between the two electrodes, i.e., the component of the battery which promotes ion transport between the two electrodes, is a liquid electrolyte and typically is a base such as KOH. Liquid electrolytes, while demonstrating acceptable ionic conductivity, tend to leak out of the cells into which they are sealed. While better manufacturing techniques have lessened the occurrence of leakage, cells do leak liquid electrolytes from time to time. Moreover, any electrolyte leakage in the cells lessens the amount of electrolyte available to the cell, thus reducing its effectiveness. Seals for wet electrochemical cells has been widely investigated for a number of years in order to try and develop systems which eliminate the liquid electrolyte leakage problem.

Electrolytes have been studied extensively during the past several years in an effort to develop solid state or substantially solid electrolytes which provide high ionic conductivity as required by virtually all electrochemical cells, in a dry or substantially dry environment so as to eliminate the problems of electrolyte leakage. Heretofore, acceptable solutions to this issue have not been developed.

Accordingly, there exists a need for a new type of electrolyte system for use in nickel metal hydride electrochemical cells which combines the mechanical stability and freedom from leakage offered by solid electrolytes, with the high ionic conductivity characteristic of liquid electrolytes.

BRIEF DESCRIPTION OF THE DRAWINGS

FIG. I is a schematic representation of an electrochemical cell in accordance with the instant invention.

DETAILED DESCRIPTION OF THE PREFERRED EMBODIMENT

Figure 1:
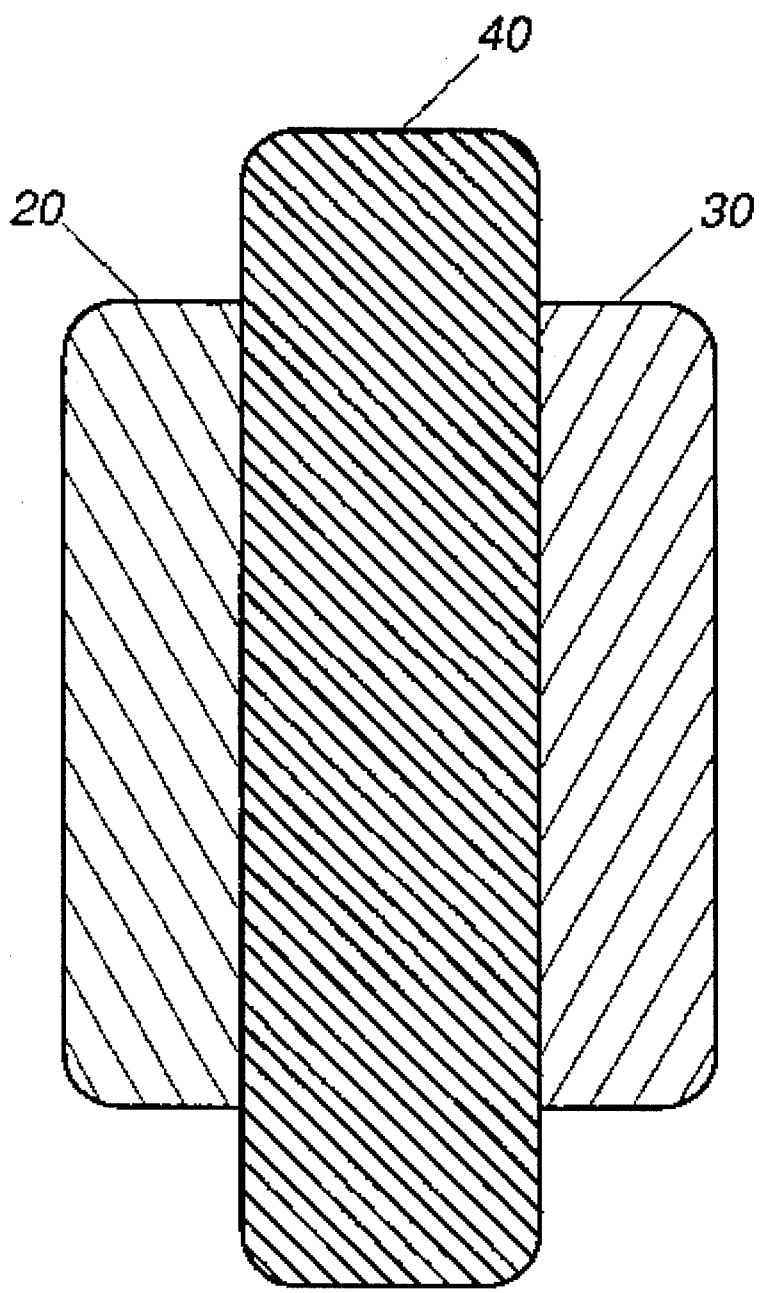

While the specification concludes with claims defining the features of the invention that are regarded as novel, it is believed that the invention will be batter understood from a consideration of the following description in conjunction with the drawing figures, in which like reference numerals are carried forward.

Referring now to FIG. 1, there is illustrated a schematic representation of an electrochemical cell 10, in accordance with the instant invention. The cell 10 may be either an electrochemical capacitor or a battery device. Preferably, the cell 10 is a battery, including at least one electrode fabricated of a hydrogen storing metal hydride material, and a counter electrode fabricated of, for example, nickel hydroxide. The cell 10 includes a positive electrode, 20, and a negative electrode, 30. According to battery industry convention, the positive electrode is defined as the cathode and the negative electrode is defined as the anode during the discharge process. The roles are reversed during the charging process. Thus, references herein to the positive electrode and the cathode refer to the electrode serving as the cathode during discharge. Similarly references herein to the negative electrode or the anode refer to the electrode serving as the anode during discharge.

The negative electrode 30 of the electrochemical cell 10 is a metal hydride hydrogen storage alloy electrode. Accordingly, the material may be either the $AB_2$ or $AB_5$ metal hydride hydrogen storage alloy material. The metal hydride hydrogen storage alloy material may be characterized by the following formula:

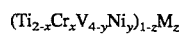

wherein M is a modifier element selected from the group of materials including chromium, cobalt, manganese, aluminum, iron, iridium, molybdenum and combinations thereof, and where x, y, z, indicate the relative proportion of each of the materials in the alloy. Alternatively, the negative electrode 30 may be fabricated of a metal hydride hydrogen storage alloy material such as that taught in U.S. Pat. No. 5,451,474 to Wu, et al issued Sep. 19, 1995, which commonly assigned U.S. Patent is incorporated herein by reference. In the '574 Patent, particles of metal hydride hydrogen storage alloy material are coated with a layer of palladium or a palladium alloy. Alternatively, the negative electrode may include cadmium in that cadmium stores hydrogen as a hydroxide.

The positive electrode 20 may be fabricated of any of a number of known materials in the electrochemical arts. In one preferred embodiment, a positive electrode may be a nickel hydroxide positive electrode as is well known to those of ordinary skill in the art.

Operatively disposed between the positive and negative electrode is an electrolyte system 40. The electrolyte system 40 comprises a polymeric support structure which has dispersed therein an electrolyte active species. The electrolyte active species may be either a solid or a liquid. When the electrolyte active species is a liquid electrolyte it is engaged or absorbed by the polymer support structure. The liquid is selected to optimize the performance of the positive and negative electrode couple. The liquid electrolyte, absorbed by the polymeric support structure is typically either an acidic or a basic solution. Preferred acidic liquid electrolyte species are proton conducting acids, such as $H_2SO_4$, $H_3PO_4$, HCL, and combinations thereof. Preferred basic liquid electrolyte active species include hydroxides, such as potassium hydroxide (KOH), lithium hydroxide (LiOH), sodium hydroxide (NaOH), and combinations thereof. Preferred solid electrolyte active species include salts of such electrolytes.

The polymeric support structure which engages or absorbs the liquid electrolyte active species may be fabricated of any of the number of different polymers Which are stable in the presence of the positive and negative electrodes. Specific examples of these materials include, for example, polyacrylic acid, polyacrylamide-co-acrylic acid, polyacrylamide, polyacrylamide cross-linked by N,N', methalene bis-acrylamide, polyurethane, polyvinylalcohol, polyethylene oxide, polyvinylidine fluoride, blends of the foregoing, copolymers of the foregoing and combinations thereof.

In a preferred embodiment, the polymer electrolyte 40 is made from a polyvinyl resin and liquid electrolyte active species. Polyvinyl resins are those polymeric materials generally considered to include polymers derived from monomers having the structure:

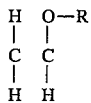

in which R represents hydrogen, an alkyl group, a halogen, or other functional groups. Many of the monomers may be prepared by addition of the appropriate compound to acetylene. Properties vary with chemical structure, crystallinity and molecular weight. For example in the preferred embodiment, the polymeric support structure is polyvinyl alcohol (PVA), which is a tough high mechanical strength polymer which can be formed into strong films, tubes, and fibers which are highly resistant to hydrocarbon solvents. In another preferred embodiment, the polymeric support structure is polyvinyl acetate, which is a leathery, colorless thermoplastic material which softens at relatively low temperatures and which is relatively stable in the presence of light and oxygen. These polymers are clear, non-crystalline, and have the chief applications as adhesives and binders for water-based paints. Both polyvinyl acetate and polyvinyl alcohol readily absorb potassium hydroxide, liquid electrolyte active species and hence provide acceptable ionic conductivity when incorporated into an electrochemical cell such as nickel metal hydride electrochemical cell.

Prior art mixtures of PVA have been known to be used with for example, phosphoric acid to produce membranes useful in gas separation technology. For example, U.S. Pat. No. 4,500,667 to Polak, et al, incorporated herein by reference, describes gas permeable $PVA/H_3PO_4$ films and methods for preparing the same.

EXAMPLES

Example I

A PVA/KOH electrolyte in accordance with the instant invention was prepared by first making an aqueous solution of PVA at a concentration range of between 1 and 20% PVA by weight. The optimum range is between 5 and 10% by weight. The PVA was added to water heated to a temperature between 50° C. and 100° C. and stirred until all the PVA was dissolved. PVA is commercially available in a wide range of molecular weights, and it has been found that PVA obtained from Aldrich Chemical Company, Inc., in the range of 80,000 to 140,000 molecular weight is a preferred material. Other molecular weights may be useful for different applications. For example, those skilled in the art of polymer science will realize that higher molecular weight polymers tend to be more structurally sound, whereas lower molecular weight polymers tend to be less rigid and flexible.

In general, the amount of the liquid electrolyte active species (i.e., KOH) to be added to the support structure will vary, depending on the desired end properties of the electrolyte. KOH aqueous systems demonstrate optimal ionic conductivity in the range of between 20–40% by weight and preferably in the range of 26–31% KOH. In this example, 31% KOH was used.

Example II

In a second example, crosslinked polyacrylamide was prepared by mixing 0.60 g of acrylamide, 0.36 g of N,N'-methylene-bis-acrylamide, 0.032 of ammonia persulfate, and 0.002 g of tetramethylethylenediamine with 50 ml of distilled water in a flask, in a nitrogen atmosphere. The mixture was allowed to gel as the water evaporated. The resulting clear polymer film was soaked in a 30 wt % KOH solution for approximately one hour. The weight of the film after soaking had doubled to about 2.0 g, and had a film thickness of about 0.26 mm, and exhibited an ionic conductivity of 0.012 s/cm as measured by impedance.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrochemical hydrogen storage cell comprising a negative electrode fabricated of a hydrogen storage alloy material capable of reversibly electrochemically storing and discharging hydrogen;

a positive electrode; and a polymer electrolyte comprising a polymeric support structure selected from the group consisting of polyacrylic acid, polyacrylamide-co-acrylic acid, polyacrylamide, polyacrylamide cross-linked by N, N', methylene bis-acrylamide, polyurethane, polyvinylalcohol, polyethylene oxide, polyvinylidine fluoride, blends of the foregoing, copolymers of the foregoing and combinations thereof, and having dispersed therein an electrolyte active species, which is either acidic or basic, and wherein said acidic electrolyte active species is selected from the group consisting of $H_2SO_4$, $H_3PO_4$, HCl, and combinations thereof, and said basic electrolyte active species is selected from the group consisting of KOH, LiOH, NaOH, and combinations thereof.

2. An electrochemical hydrogen storage cell as in claim 1, wherein said polymeric support structure is polyvinyl alcohol having dispersed therein KOH.

3. An electrochemical hydrogen storage cell as in claim 1, wherein said hydrogen storage alloy material is an $AB_2$ type hydrogen storage alloy material.

4. An electrochemical hydrogen storage cell as in claim 1, wherein said hydrogen storage alloy material is an $AB_5$ type hydrogen storage alloy material.

5. An electrochemical hydrogen storage cell as in claim 1, wherein said hydrogen storage alloy material includes cadmium.

6. An electrochemical hydrogen storage cell as in claim 1, wherein said hydrogen storage alloy material comprises a plurality of hydrogen storage alloy material particles, each said particle being coated with a layer of palladium or a palladium alloy.

* * * * *